US005755323A

United States Patent [19]
Zahn et al.

[11] Patent Number: 5,755,323
[45] Date of Patent: May 26, 1998

[54] PACKAGE AND KIT FOR AND METHOD OF SELECTING A REPLACEMENT BEARING

[75] Inventors: Henry Zahn, Tulsa, Okla.; Scott G. Biltz, Apple Creek, Ohio; Bridget L. Heist, Tulsa, Okla.

[73] Assignee: The Timken Company, Canton, Ohio

[21] Appl. No.: 629,447

[22] Filed: Apr. 9, 1996

[51] Int. Cl.⁶ .................................................. B65D 85/58
[52] U.S. Cl. ........................ 206/318; 206/303; 206/459.5; 206/470; 211/59.1
[58] Field of Search ........................ 248/220.31; 211/13, 211/59.1; 206/303, 318, 459.5, 493, 461, 470

[56] References Cited

U.S. PATENT DOCUMENTS

| D. 104,867 | 6/1937 | McIntosh . |
| D. 249,655 | 9/1978 | Gullaksen et al. . |
| 477,475 | 3/1892 | Pomeroy . |
| 861,582 | 7/1907 | Fildes . |
| 1,212,279 | 1/1917 | Stone . |
| 1,950,469 | 3/1934 | Barwood . |
| 2,018,106 | 10/1935 | Zahodiakin . |
| 2,475,450 | 7/1949 | Dvorak . |
| 2,728,145 | 12/1955 | Holladay . |
| 2,896,333 | 7/1959 | Kivela . |
| 3,024,579 | 3/1962 | Stockhausen et al. ............... 206/318 X |
| 3,080,964 | 3/1963 | Robinson et al. ............... 206/459.5 X |
| 3,221,874 | 12/1965 | Pitner ........................ 206/318 |
| 3,230,628 | 1/1966 | Hite . |
| 3,238,629 | 3/1966 | Hurwitz . |
| 3,416,650 | 12/1968 | Mortensen . |
| 3,654,744 | 4/1972 | Smith ........................ 206/318 X |
| 3,703,234 | 11/1972 | Howard . |
| 4,138,820 | 2/1979 | O'Connor . |
| 4,177,570 | 12/1979 | Hewitt . |
| 4,815,610 | 3/1989 | Borick et al. ............... 211/59.1 |
| 5,131,162 | 7/1992 | Miller . |

FOREIGN PATENT DOCUMENTS

| 2155047 | 5/1973 | Germany ........................ 706/318 |

*Primary Examiner*—Bryon Gehman
*Attorney, Agent, or Firm*—Polster, Lieder, Woodruff & Lucchesi, L.C.

[57] ABSTRACT

A kit facilitates selecting a bearing, to replace a used and perhaps defective bearing, in that the kit contains the replacement bearing encapsulated in a package that may include related components, such as a seal, dust cover and cotter pin. The package also includes a gauge which will mate with the bearing in the package at a distinguishing diameter on the bearing. One seeking to replace the used bearing fits that bearing at the distinguishing diameter on it to the gauge to determine if they mate in the same manner that the bearing mates with a machine component. If it does, the bearing in the package corresponds with the used bearing sought to be replaced. If not, one continues the comparison until a package is found having a gauge that mates with the used bearing. In lieu of the gauges being on the packages for the kits, they may be on a display which holds the kits.

16 Claims, 3 Drawing Sheets

PACKAGE AND KIT FOR AND METHOD OF SELECTING A REPLACEMENT BEARING

BACKGROUND OF THE INVENTION

The invention relates to the presentation of goods for sale, and more particularly to a package and kit and package for a replacement bearing and a method of selecting a replacement bearing.

A variety of light trailers exist for attachment to automobiles, light trucks and vans. Some carry boats, others carry motorcycles or perhaps jet skis, while still others are used for general hauling. The typical trailer has a single axle, and relatively small wheels which rotate on spindles at the ends of the axle. Actually, the wheels are bolted to hubs which fit over the spindles. Between each hub and its spindle are two antifriction bearings which are mounted in opposition so that the bearings confine the hub both radially and axially, but of course leave it free to rotate. Each bearing has a single row of rolling elements which moves along raceways that are oblique to the axis of rotation, so that the bearing accommodates radial a load as well as thrust in the direction that seats the rollers along the oblique raceways.

Trailer bearings tend to fail at more frequent intervals than the wheel bearings of automobiles. After all, they operate at higher speeds, owing to the relatively small diameters of the wheels which turn on them. Moreover, boat trailers are backed into water on frequent occasions, and the water sometimes enters the bearings, deteriorating the grease that lubricates them and causing corrosion. All of this has led to the development of an aftermarket in trailer bearings.

Indeed, trailer bearings are now available in packaged kits, with the typical kit including an inner race and a complement of rolling elements around it, an outer race, perhaps a seal and even a dust cover, sometimes a tube of grease, and often a cotter pin. The package normally includes a paperboard backing against which the foregoing components are held with a shrinkwrap film. Some further include a clamshell outer package.

The size of the spindle for a trailer axle usually determines the replacement bearing one purchases, for the inner race of the bearing must slide easily over the spindle without excessive clearance. In short, the bore of the inner race must match the spindle. Most axle spindles have one of four diameters, which differ by as little as 1/16 inch. Even though the bore size appears on the package, purchasers not infrequently select the wrong replacement bearing, only to discover the error after the package is opened. Usually the purchaser returns the bearing in its opened package to the store from which it was purchased and exchanges it for the correct bearing. This leaves the store with an opened package which a store employee must attempt to repair, as best one can, to place it on sale again. But customers harbor suspicions about opened and resealed packages and are less likely to purchase a product in such a package. It is estimated that 20% of the bearing kits that are sold are returned with opened packaging, because the customer selected the wrong size.

The present invention resides in a kit that includes a replacement bearing or bearing component and a package which contains the bearing or bearing component. The package or the display on which it is presented has a gauge which enables one to compare a bearing sought to be replaced with the bearing in the package without opening the package.

DESCRIPTION OF THE DRAWINGS

In the accompanying drawings which form part of the specification and wherein like numerals and letters refer to like parts wherever they occur.

DETAILED DESCRIPTION

Figure 3:
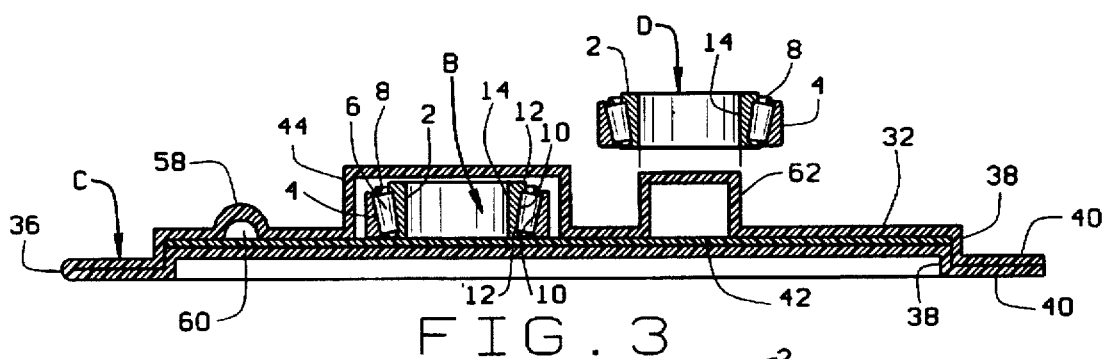
FIG. 3 is a sectional view taken along line 3—3 of FIG. 6 and showing a used bearing aligned with a gauge on the package of the kit.

Referring now to the drawings, a kit A includes (FIGS. 1 & 3) a bearing B and a package C which encapsulates the bearing B and perhaps related components as well, that is to say components which facilitate the installation of the bearing B as a replacement for another bearing D of equivalent size which has perhaps experienced some deterioration or even failure. The package C confines the bearing B and related components in an orderly arrangement, presenting them favorably to potential purchasers. It further isolates the bearing B from moisture and other contaminants. Finally, it enables potential purchasers to compare the bearing D sought to be replaced with the bearing B in the package C without actually opening the package C.

The bearing B may serve as a replacement for a bearing on the end of an axle for a small vehicular trailer. As such it will operate as one of two bearings, usually identical, which are mounted in opposition for enabling a hub to rotate with minimum friction about the axle, all while being confined both axially and radially on the axle.

The bearing B typically is a tapered roller bearing having (FIGS. 2 & 3) an inner race in the form of cone 2, an outer race in the form of cup 4, rolling elements in the form of tapered rollers 6, and a cage 8. The cone 2 usually fits around a spindle on the end of an axle, whereas the cup 4 is normally pressed into a bore within a hub. The tapered rollers 6 fit between the cone 2 and the cup 4, enabling one to rotate easily with respect to the other. The cage 8 maintains the correct spacing between the rollers 6. As a consequence, the hub which contains the cup 4 will rotate with little resistance on the spindle which holds the cone 2. To this end, the cone 2 and cup 4 have tapered raceways 10 which are presented toward each other. The tapered rollers 6 contact the cone 2 and cup 4 along the tapered raceways 10. While the tapered raceway 10 of the cup 4 extends from one end of the cup 4 to the other without interruption, the raceway 10 of the cone 2 lies between two ribs 12 located at the ends of the cone 2. In the operation of the bearing B, the rib 12 at the large end of the cone raceway 10 serves to position the tapered rollers 6 axially between the cone 2 and cup 4 and indeed prevents them from being expelled from the annular space between the cone 2 and the cup 4. On the other hand, when the cone 2 is withdrawn from the cup 4, the two ribs 12 together with the cage 8 serve to retain the rollers 6 around the cone raceway 10. As a consequence, the cone 2, the rollers 6, and the cage 8 form a unit known as a cone assembly.

The cone 2 further contains a bore 14 which opens out of its ends. The bore 14 has a constant diameter which is large enough to enable the cone 2 to pass easily over a spindle without excessive clearance. Thus, one who purchases the bearing B, perhaps to replace a bearing D rendered defective through use, must select a bearing B in which the cone bore 14 has a diameter that is the same as the diameter of the bore 14 in the cone 2 of the bearing D which is to be replaced. Where the bearing B is used in the wheel of a light trailer, a match in the bore 14 of the cone 2 should bring about a like match in the cup 4. Actually, most light vehicular trailers have one of four different bearings B, each with a different diameter for the bore 14 of its cone 2. So by selecting the replacement bearing B with the proper diameter for its cone bore 14, one should obtain the correct replacement bearing B. In that sense the diameter of the cone bore 14 for a bearing B serves to distinguish the bearing B from other bearings B of different size, or in other words, the diameter of the cone bore 14 is a distinguishing dimension for the bearing B.

The related components contained within the package C may include (FIG. 2) a seal 20 which fits into the hub beyond the inboard cup 4 to establish a fluid barrier with the axle adjacent to the inboard cone 2. They may also include a dust cover 22 that fits into the hub beyond the outboard cup 4 to completely close that end of the hub. Other related components could be a cotter pin 24 for securing a nut that threads over the end of the spindle to hold the bearing B on the spindle, and even a tube of grease for providing the lubrication required for the operation of the bearing B. Since the bearing B usually operates as one of a pair of identical bearings B, the kit A may include and the package C may contain two identical bearings B.

The package C encapsulates the bearing B and related components and arranges them in an orderly and attractive presentation designed to appeal to potential customers. In addition, the package C serves as a gauge to enable one to determine whether or not the bearing B of the kit A is suitable for use as a replacement for the bearing D one seeks to retire.

The package C is of the clamshell variety, it being formed from a transparent material having a measure of stiffness to give some body to the package C. One suitable material is polyvinyl chloride (PVC). Being of the clamshell variety, the package C has a front panel 32 and a back panel 34 which are joined together at a hinge 36 that is formed integral to the panels 32 and 34. The hinge 36 enables the package C to fold between open and closed conditions. When the package C is open (FIG. 2), the two panels 32 and 34 lie end to end, so that the bearing B and additional components may be placed into it. However, when the package C is closed (FIGS. 1 & 3), the two panels 32 and 34 lie face to face with the bearing B and the related components captured between them and isolated from surrounding atmosphere. To this end, the two panels 32 and 34 have their margins in registration, and this registration is maintained by flanges 38 which in effect nest. Actually, the flanges 38 are set slightly inwardly from the margins on the panels 32 and 34, with the panels 32 and 34 turning outwardly beyond the flanges 38 in the form of peripheral lips 40. When the package C is closed the flanges 38 of the back panel 34 align with and fit snugly into the flanges 38 of the front panel 32, thus interlocking the two panels 32 and 34 and providing an effective fluid barrier around the periphery of the package C. Also, when the package C is closed, the lips 40 on the front panel 32 overlie the lips 40 on the rear panel 34. Indeed, the panels 32 and 34 are joined permanently together along their lips 40 to prevent them from separating, that is folding away from each other.

Between the two panels 32 and 34 lies a paperboard backing 42 on which the size of the bearing B, instructions for matching a used bearing D with the bearing B, the procedure for installing the bearing B, and other information is printed. The rear panel 34, within the confines of its flange 38, is flat and the paperboard backing 42 lies directly against this portion of the panel 34. The flanges 38 of the front panel 32 confine the backing 42 laterally.

Figure 1:
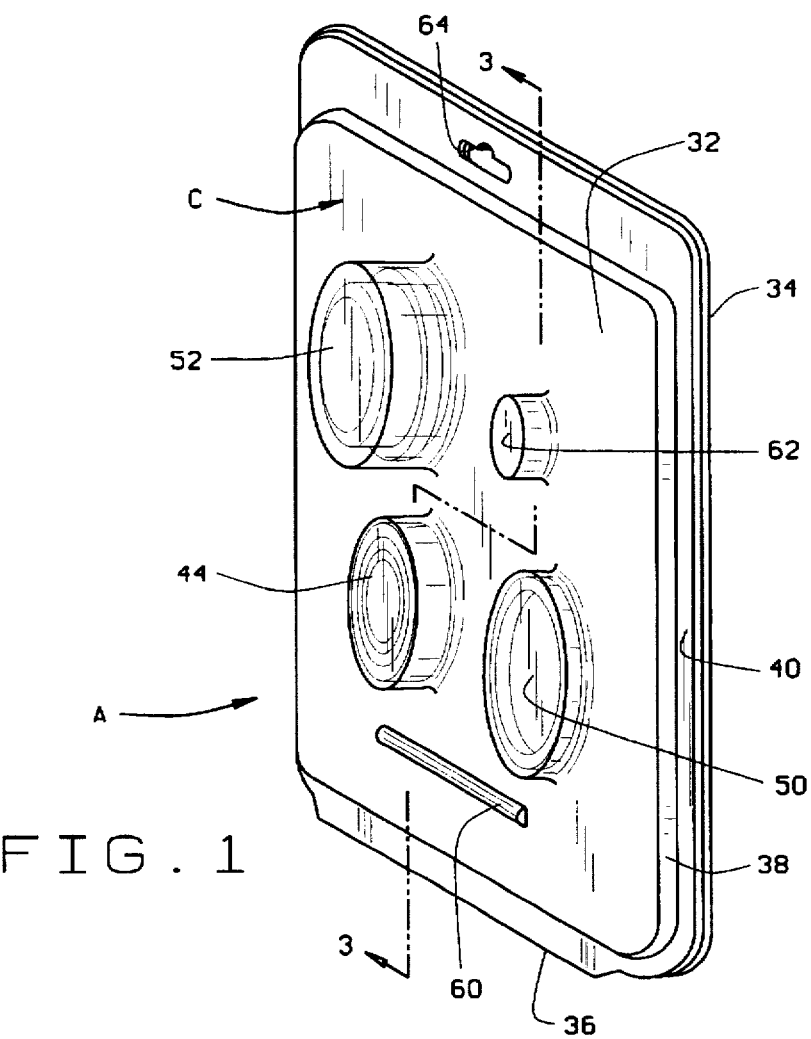
FIG. 1 is a perspective view of a replacement kit constructed in accordance with and embodying the present invention.
Figure 2:
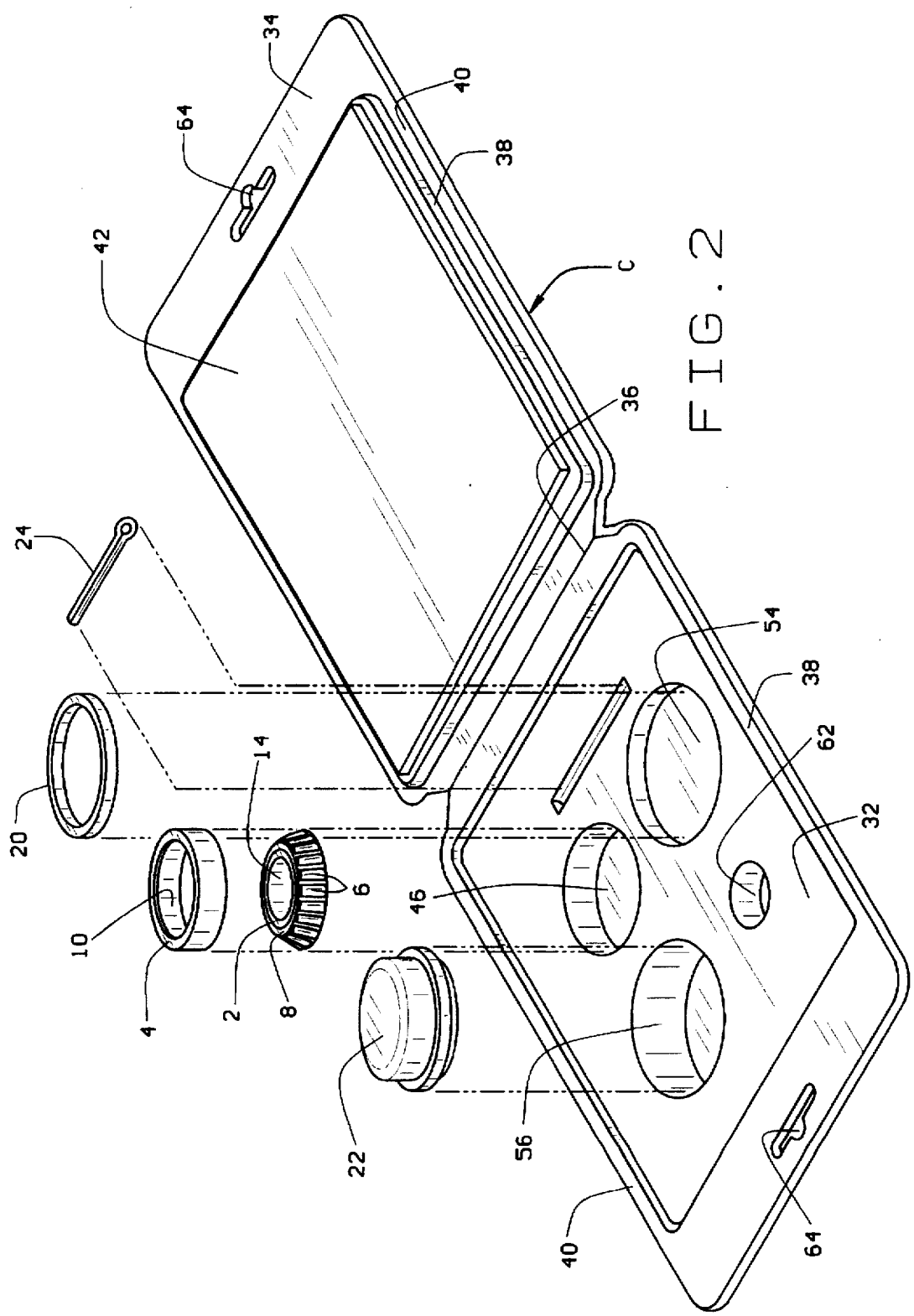
FIG. 2 is an exploded perspective of the kit with its clamshell package open.

The front panel 32, on the other hand, within the confines of its ribs 38, has several embossments which form compartments within the interior of the package 30 (FIGS. 1 & 2). More specifically, the front panel 32 has a cylindrical embossment 44 that creates a compartment 46 of like configuration. The compartment 46 contains the bearing B with its cone 2 and rollers 6 fitted into the cup 4. The panel 32 has two more cylindrical embossments 50 and 52 which form cylindrical compartments 54 and 56, respectively. The seal 20 fits into the compartment 54, while the dust cover 22 fits into the compartment 56. In addition, the front panel 32 has an elongated embossment 58 that forms an elongated compartment 60. The cotter pin 24 fits into the compartment 60.

Finally, the front panel 32 has still another embossment 62 which, like the embossments 44, 50 and 52, is cylindrical in configuration, but the embossment 62 serves a different purpose—that of a gauge. In this regard, the outside diameter of the embossment 62 is only slightly smaller than the diameter of the bore 14 in the cone 2 for the bearing B that is in the package C, and indeed is the size of a spindle over which the cone 2 is designed to fit. Enough clearance exists between the embossment 62 and the sides of the other embossments 44, 50, 52 and 58 to enable the cone 2 and its complement of tapered rollers 6, that is the cone assembly, to fit over the embossment 62 without interference from the other embossments 44, 50, 52 and 58. The embossment 62 likewise creates a compartment within the package C, and that compartment may contain one of the related components, or it may simply remain empty.

Finally, the package C near its top margin has an aperture 64 which enables the kit A to be suspended with other kits A from a display, such as on hooks projected from pegboard. Among all of the kits A in the display will be bearings B suitable for replacing most bearings currently in use for a certain application, such as, for mounting the wheels of small vehicular trailers. Of course, the embossment 62 on the package C for each kit will correspond to the bearing B of that kit A in the sense that the bore 14 of the cone 2 will slide over the embossment 62 with minimum clearance.

In use, the individual desiring to replace a bearing D (FIG. 3) for a trailer wheel or some other application, removes the bearing D or at least the cone 2 of the bearing D and brings it to the display that holds the kits A containing replacement bearings B of varying sizes, such as the sizes commonly used on trailer axles. By aligning the bore 14 of the cone 2 for the used bearing D with the embossments 62 on several packages C, the individual selects the kit A in which the fit between the cone 2 of the used bearing D and the embossment 62 on the package C for that kit A matches the fit between the cone 2 and the spindle from which it was removed. To this end, the cone 2 should match properly with the embossment 62 in the sense that it fits over or mates with the embossment 62 with minimum radial clearance. This identifies the kit A containing the bearing B which is the proper replacement for the used bearing D.

Even if the individual purchases one of the replacement kits A from the display without the benefit of the used bearing D in hand, but instead relies on an estimation, that individual, upon actually removing the bearings D can determine whether or not he purchased the correct kit A by fitting the cone 2 of the removed bearing D to the embossment 62 of the purchased kit A to see if a proper match exists. If the two do not mate properly, the individual may return the kit A for exchange, all without having ever opened the package C.

Figure 4:
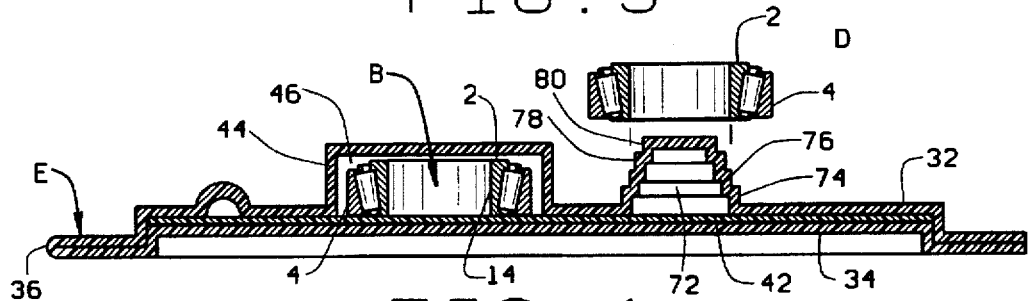
FIG. 4 is a fragmentary sectional view of a modified package having another gauge.

A modified package E (FIG. 4) differs from the package C in that its gauge takes the form of a stepped embossment 72 instead of the purely cylindrical embossment 62. The stepped embossment 72 has cylindrical segments 74, 76, 78, 80 which lie along a common axis, with each being progressively smaller from the base of the embossment 72 outwardly. The diameter of each segment 74, 76, 78, 80 corresponds to the diameter of the bore 14 for the cone 2 of a different bearing B. This enables one to determine the proper replacement kit A by utilizing the stepped embossment 72 on a single kit A.

Figure 5:
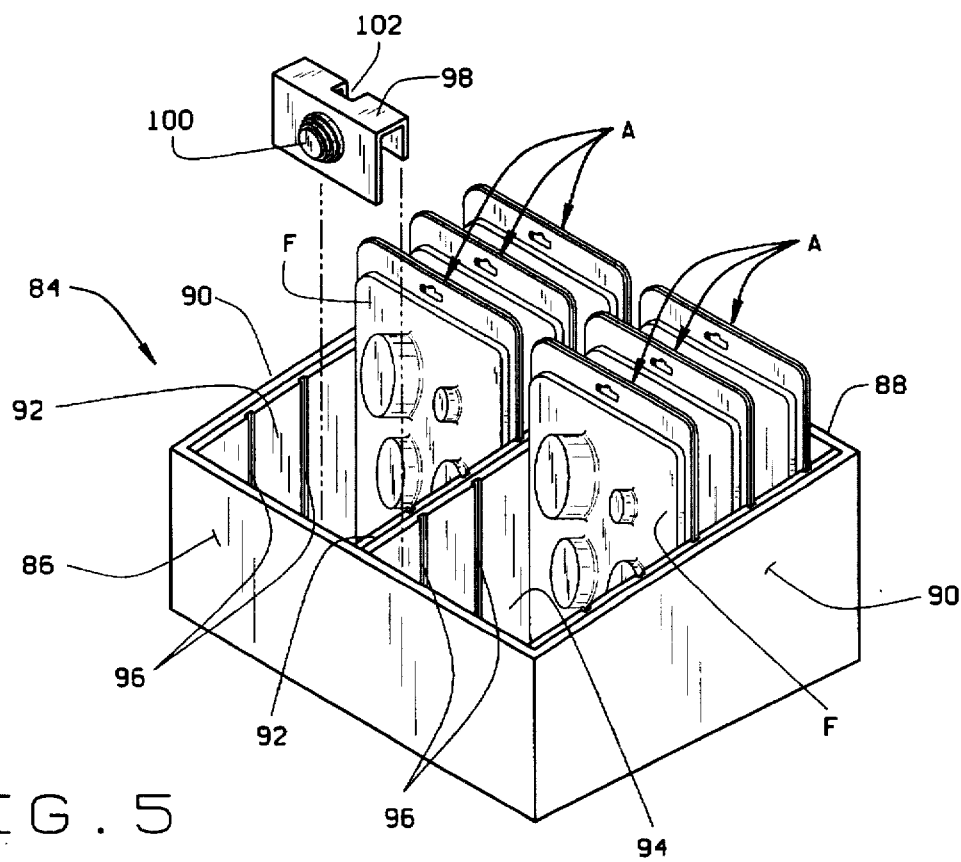
FIG. 5 is a perspective view of a display containing kits and having a gauge for selecting the correct kit.

The gauges need not be on the kits A, but instead may be on displays associated with the kits A. In this instance, the kits A have modified packages F which contain the bearings B and other related components, but need not have the embossments 62 or 72 which serve as gauges. The kits A are supplied in a display box 84 (FIG. 5) having front and back walls 86 and 88 and side walls 90, and also a partition 92 extending between the front and back walls 86 and 88, all of which enclose two compartments 94 in which the kits A are arranged in side-by-side rows. The partition 92 has vertical slots 96 as do the side walls 90, and the sides of the packages F fit into the slots 96, so that the kits A remain upright in the compartments 92.

While externally the several kits A, and particularly their packages F, may appear the same, the bearings B of some of the kits A will differ in size from the bearings B in other kits A. In other words, the bearings B of the several kits A may have different distinguishing dimensions.

In addition to the kits A, the box 84 also contains U-shape holder 98 having a stepped gauge 100 on one of its faces. The gauge 100 resembles the stepped embossment 72 on the package E. The holder 94 is configured to fit snugly over the front wall 86, at the partition 92 and indeed contains a slot 102 to receive the partition 92. Once the box 84 is opened to expose the kits A, the U-shaped holder 98 is removed and installed over the front wall 86 such that its stepped gauge 100 projects forwardly away from the front wall 90. The gauge may also take the form of several projections, each of a different diameter, with those diameters corresponding to the diameters of the cone bores 14 for the different bearings B in the several kits A.

One seeking to replace a used bearing D fits the cone 2 of that bearing D over the gauge 100 and quickly identifies that section of the gauge 100 at which the fit corresponds to the fit with the spindle from which the cone 2 of the used bearing D was removed. That, in turn, identifies a replacement kit A having a bearing B in which the cone 2 is identical to the cone 2 of the used bearing D.

Figure 6:
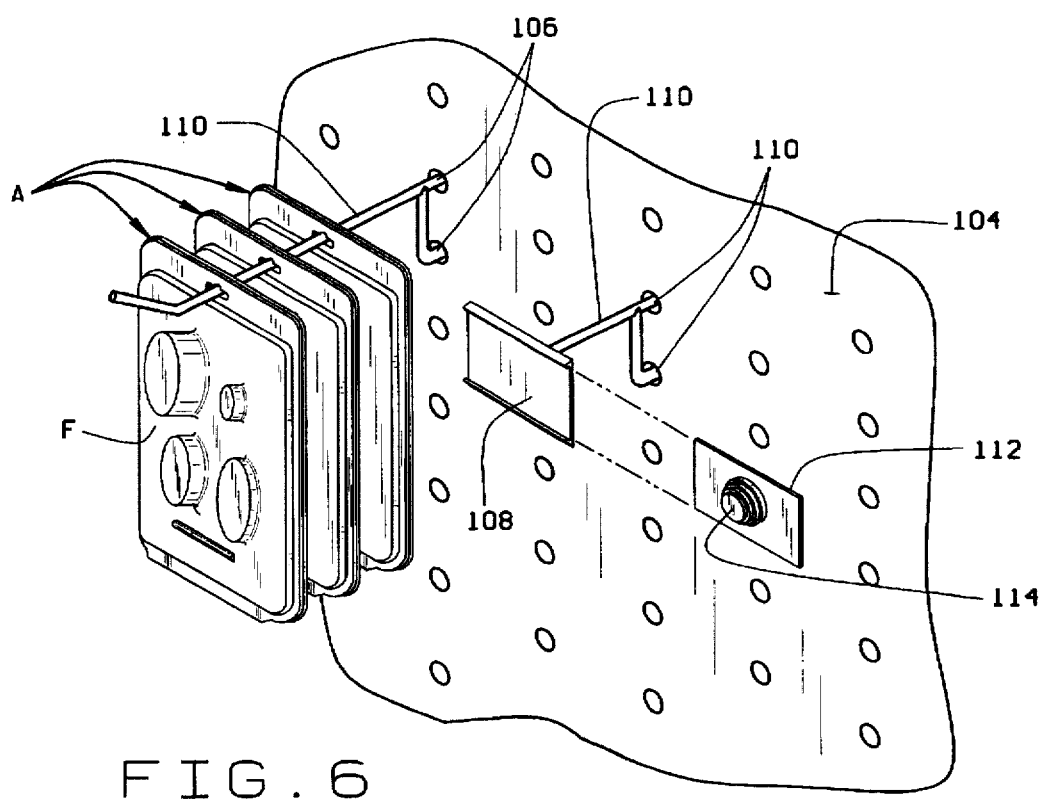
FIG. 6 is a perspective view of another display from which the kits are suspended on hooks and likewise having a gauge.

The display may also take the form of a panel 104 (FIG. 6), such as pegboard, with display hooks 106 protruding from it. The hooks 106 are small enough to fit through the aperture 64 in packages F and indeed the kits A are suspended from the hooks 106.

The display also includes a holder 108 which is attached to a rod 110 which in turn is engaged with or otherwise attached to the panel 104, all such that the holder 108 is presented outwardly from the panel 104. The holder 108 carries a card 112 from which a stepped gauge 114 projects. The gauge 114 resembles the stepped embossment 72 on the package E. In the alternative, the gauge may consist of a series of embossments projecting from the card 112, each of a different diameter, with those diameters corresponding to the diameters of the cone bores 14 for the different bearings B in the several kits A.

Again, one desiring to purchase a bearing B to replace a used and perhaps damaged bearing D, fits the used bearing D to the gauge 114 and determines the section or diameter of the gauge 114 which corresponds, in terms of fit, to the spindle from which the cone 2 of the used bearing D was removed. The individual then selects the kit A that has a bearing B which identifies with that section of the gauge 114 over which the cone 2 of the used bearing D best fits.

The kit A need not contain the full bearing B, but instead only a component, such as the cup 4, or the cone assembly consisting of the cone 2 and rollers 6 retained on the cone 2 by the cage 8. A kit A may also include two bearings B instead of one.

Where the kit includes only a cup 4, or where the outside diameter of the cup 4 will serve to identify the replacement for the entire bearing B of which it is a component, the gauge may take the form of a cylindrical socket, whether it opens out of the front panel of a package or is on the display. The individual seeking a replacement cup 4 or bearing B, inserts the cup 4 of the used bearing into the socket until that person finds a pocket that receives the cup 4 with the least clearance. That identifies the proper replacement cup 4 or bearing B.

This invention is intended to cover all changes and modifications of the example of the invention herein chosen for purposes of the disclosure which do not constitute departures from the spirit and scope of the invention.

What is claimed is:

1. In combination with a bearing component having a distinguishing dimension which serves to identify the component, a package in which the bearing component is contained, said package having a gauge which has a dimension corresponding to the distinguishing dimension on the bearing component and is exposed on the exterior of the package where it is accessible without disturbing the bearing component in the package, the gauge being configured to fit to the bearing component to enable one to determine whether or not another bearing component matches the bearing component in the package.

2. The combination according to claim 1 wherein the bearing component is a bearing race having a cylindrical surface, and its distinguishing dimension is the diameter of the cylindrical surface.

3. The combination according to claim 2 wherein the cylindrical surface defines a bore, and the gauge is a projection which will fit into the bore with little clearance.

4. The combination according to claim 3 wherein the package contains an embossment which forms a compartment in the package, and the bearing component is in the compartment.

5. The combination according to claim 4 wherein the projection that forms the gauge is spaced sufficiently from the embossment that forms the compartment to enable the component to fit over the projection without contacting the embossment.

6. The combination according to claim 5 wherein the package contains two panels which are joined together to close the compartment and capture the bearing component between the panels.

7. The combination according to claim 1 wherein the gauge is segmented into steps, each having a different dimension, and the dimensions correspond to distinguishing dimensions for bearing components of varying size; and wherein the dimension of one of the steps corresponds to the distinguishing dimension of the bearing component in the package, whereby one can not only determine whether the other bearing component matches the component of the package, but can also determine whether the other bearing component matches a component having a different distinguishing dimension.

8. A kit for displaying a replacement bearing having multiple components, one of which has a distinguishing diameter that serves to identify the bearing, said kit comprising: a replacement bearing having multiple components corresponding to components of a bearing that is to be replaced, with one of the components of the replacement bearing having a distinguishing diameter and one of the components of the bearing to be replaced having a corresponding distinguishing diameter; and a package in which the replacement bearing is contained, the package having a gauge in the shape of a formation which matches the configuration of the one bearing component of the replacement bearing at the surface thereon which has the distinguishing diameter, the gauge being exposed on the exterior of the package where it is accessible without opening the package, whereby one seeking to replace a bearing can determine if the one component of the bearing sought to be replaced matches the corresponding component of the bearing in the package by ascertaining whether or not the one component of the bearing sought to be replaced mates properly with the gauge on the package, all without disturbing the components in the package.

9. A kit according to claim 8 wherein the package includes a panel containing embossments, with one of the embossments forming a cavity in which the replacement bearing is located and another of the embossments being the formation that serves as the gauge.

10. A kit according to claim 9 wherein the panel containing the embossments is transparent.

11. A kit according to claim 8 wherein said one component of the replacement bearing contains a bore and the distinguishing diameter is the diameter of the bore; and wherein the formation that serves as a gauge projects from the package.

12. A kit according to claim 11 wherein the formation that serves as a gauge is cylindrical.

13. A kit according to claim 8 wherein the formation that serves as the gauge is stepped to provide multiple dimensions, one of which corresponds with the distinguishing diameter of said one bearing component in the package in the sense that the formation at that dimension will properly mate with said one component in the package at the surface having the distinguishing diameter on that bearing component.

14. A process for selecting a first bearing as a replacement for a second bearing, said process comprising encapsulating first bearings of different sizes in separate packages so that each package contains a first bearing, each package having a gauge that will mate with the first bearing in the package at a surface of distinguishing diameter on the first bearing in the package, the gauge for each package being on the exterior of the package where it is accessible without disturbing the first bearing in the package; fitting the second bearing to the gauge on at least one of the packages to determine if the distinguishing diameter of the surface for the second bearing corresponds to the distinguishing diameter for the surface on the bearing in the package; and selecting the package containing the first bearing, the distinguishing diameter of which corresponds to the distinguishing diameter of the second bearing.

15. The process according to claim 14 wherein each first bearing and the second bearing has a race provided with a bore, and the distinguishing diameter for each first and second bearing is the diameter of the bore; and wherein the gauge on each package is a projection on the package.

16. The process according to claim 15 wherein the projection is cylindrical, with its diameter corresponding to the distinguishing diameter of the first bearing in the package.

* * * * *